Nov. 7, 1967  W. B. McLEAN  3,351,035
CONTROLLED UNDERSEA VESSEL
Filed April 4, 1966  3 Sheets-Sheet 1
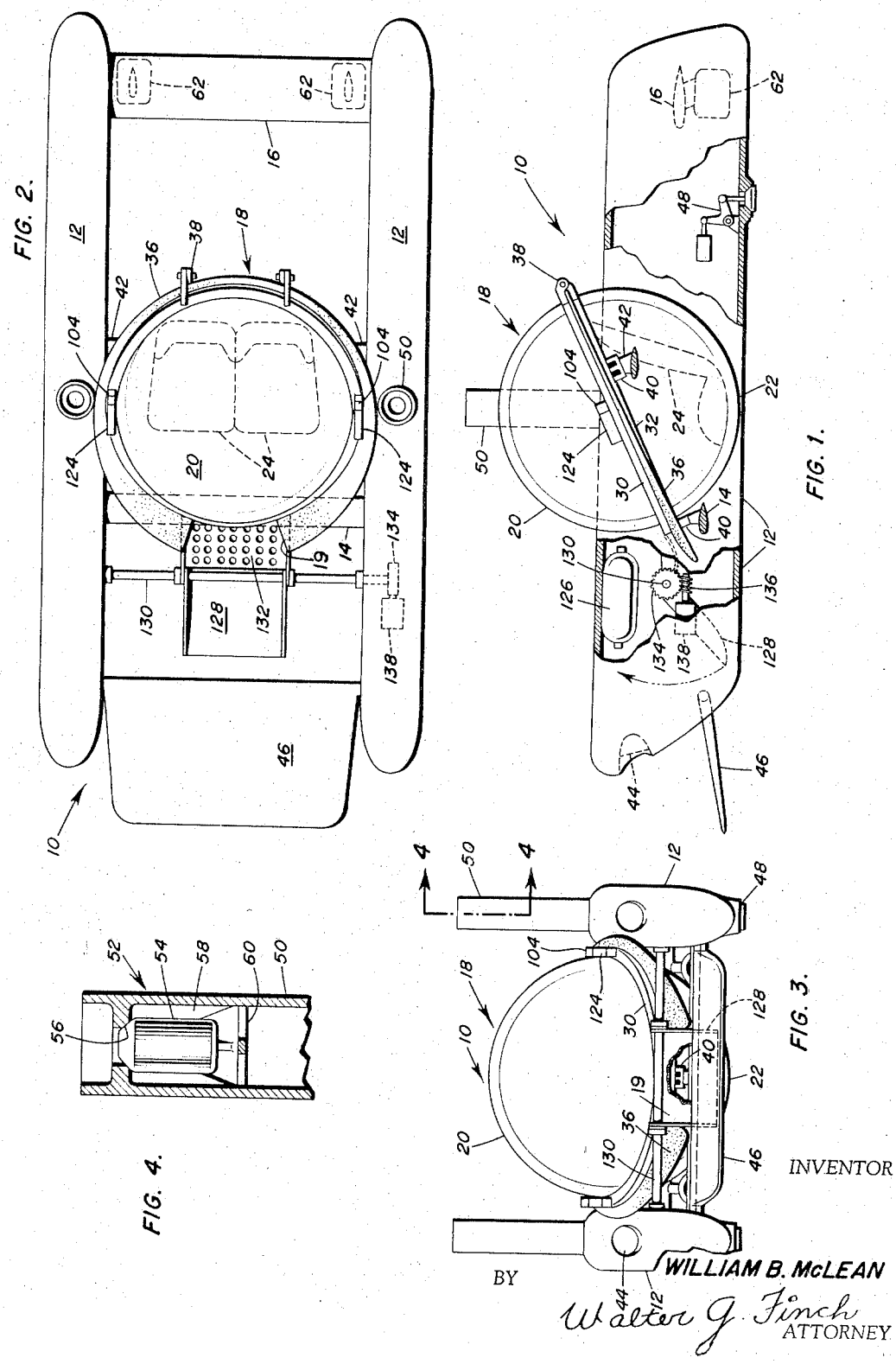
INVENTOR
WILLIAM B. McLEAN
BY
Walter G. Finch
ATTORNEY Nov. 7, 1967  W. B. McLEAN  3,351,035
CONTROLLED UNDERSEA VESSEL
Filed April 4, 1966  3 Sheets-Sheet 2
FIG. 5.
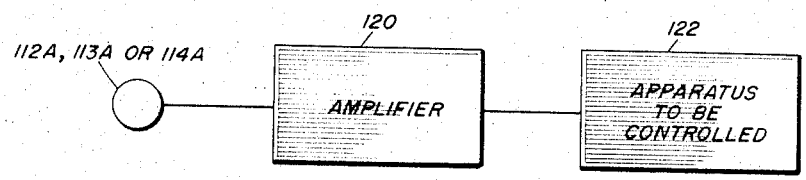
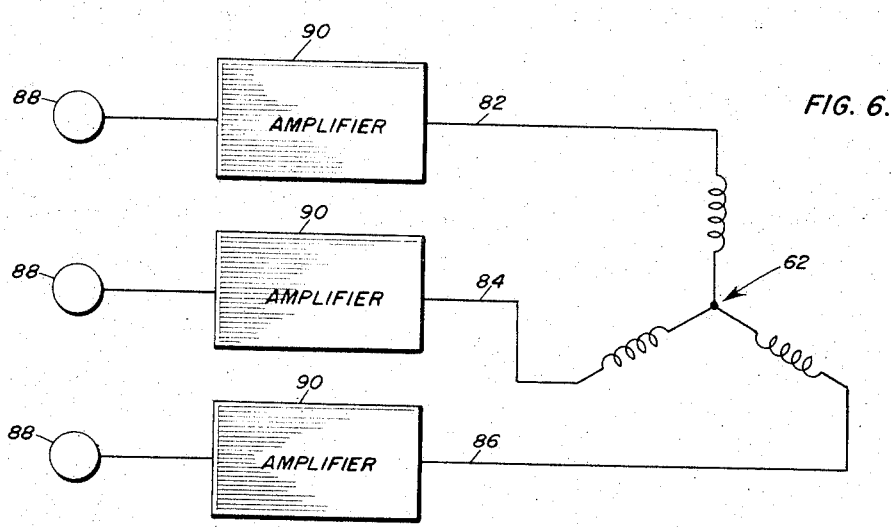
FIG. 6.
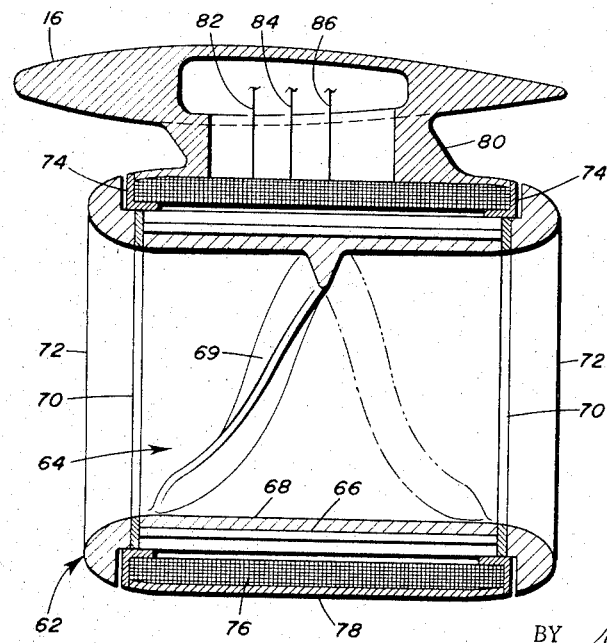
FIG. 7.
WILLIAM B. McLEAN
INVENTOR
BY Walter G. Finch
ATTORNEY

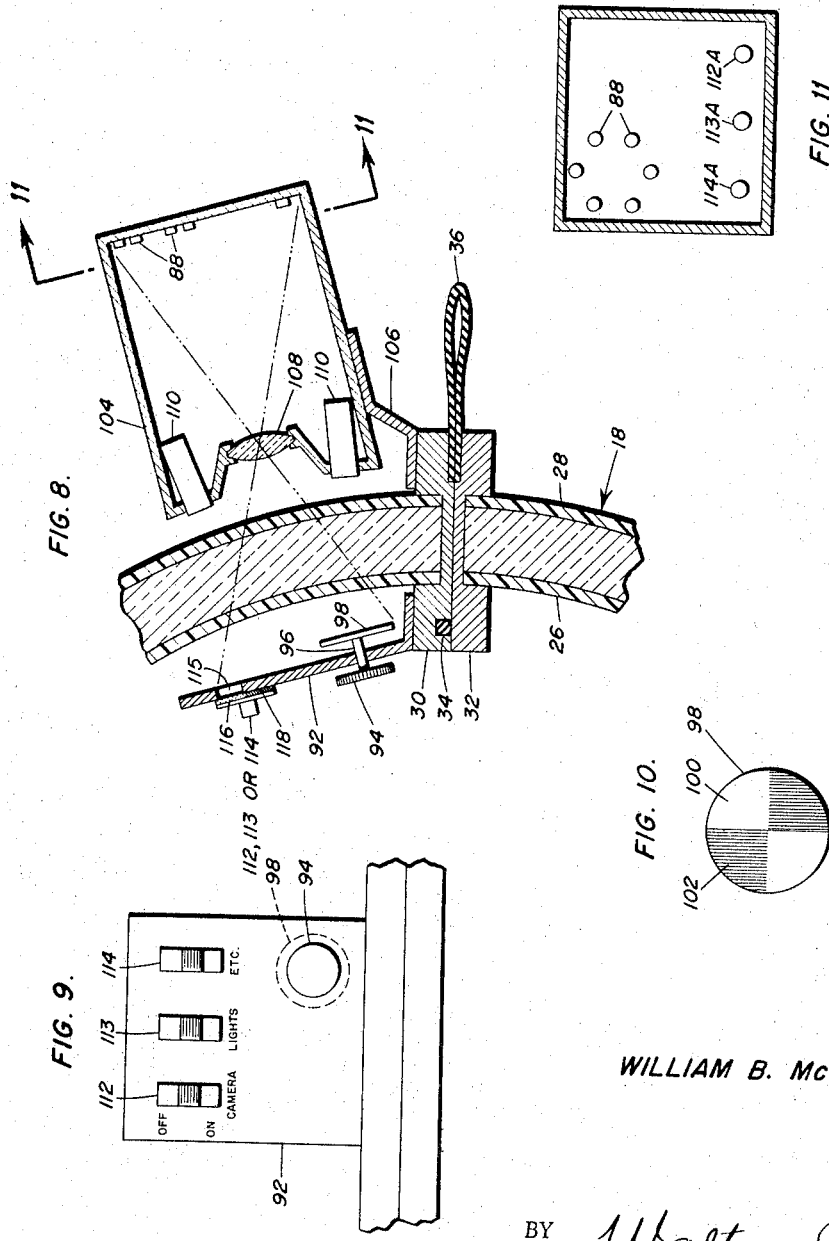

United States Patent Office

3,351,035
Patented Nov. 7, 1967

3,351,035
CONTROLLED UNDERSEA VESSEL
William B. McLean, China Lake, Calif., assignor to
Walter G. Finch, Baltimore, Md.
Filed Apr. 4, 1966, Ser. No. 539,712
25 Claims. (Cl. 114—16)

ABSTRACT OF THE DISCLOSURE

Control for an underwater vessel is provided by control equipment positioned exterior of said vessel, a radiant energy responsive power source positioned exterior of the vessel for powering the control equipment and radiant energy signal supplied from within said vessel for controlling the power source through a radiant energy permeable section of the vessel, whereby no apertures in the vessel are necessary for this control purpose.

---

This invention relates generally to submarine vessels, and more particularly it pertains to optical control arrangements for operating external devices from within a life-supporting sphere.

It has been well substantiated that great undersea pressures are well withstood by spherical personnel capsules. Recently experiments have shown that glass spheres protected inside and out with certain transparent phenolic resins have ideal characteristics for this purpose. The only difficulties presently remaining in the use of these spheres is the difficulty of providing openings for control leads and for entrance and exit of a crew.

It is an object of this invention, therefore, to provide a novel transparent spherical personnel enclosure for an undersea vehicle designed to open on an equatorial line so as to possess the greatest possible pressure resistance.

Another object of this invention is to provide an undersea vehicle which is entirely controlled and operated by optical means through the transparent wall of a personnel sphere so as to avoid weakening it with openings.

Still another object of this invention is to provide optical motor control through the transparent sphere walls which by phase and frequency command will operate it at any degree of speed forward or reverse as desired.

Even another object of this invention is to provide a plastic coating of matching index of refraction to allow use of spheres having an optically poor surface as cast thus avoiding labor and expensive grinding to render a polished clear capsule.

Yet another object of this invention is to provide on and off control swtiching by novel optical command from a control panel behind a window.

A further object of this invention is to provide an optical command system which is insensitive to stray steady state light.

To provide a totally immersed propelling arrangement for driving an undersea craft, is yet another object of this invention.

To provide a protective maneuverable hull arrangement for a glass deep water personnel sphere which can be flooded for diving or purged with gas for rising, is still another object of this invention.

Other objects and attendant advantages of this invention will become more readily apparent and understood from the following detailed specification and accompanying drawings in which:

FIG. 1 is a generally diagrammatic side view of an undersea vessel embodying features of this invention;
FIG. 2 is a top view thereof;
FIG. 3 is a front view of the vessel;
FIG. 4 is a section taken on line 4—4 of FIG. 3 showing details of a float valve;
FIG. 5 is a block diagram of the command receiving elements of a switch control arrangement for the vessel;
FIG. 6 is a block diagram similar to FIG. 5 but showing a motor control arrangement;
FIG. 7 is a cross section of a propulsion motor for the vessel;
FIG. 8 is an enlarged vertical section through the sphere showing the relationship of the control panel within and signal receiving box without;
FIG. 9 is a front view of a typical control panel for the vessel;
FIG. 10 depicts a disc of a control spinner; and
FIG. 11 is a view taken on line 11—11 of FIG. 8 showing the arrangement of photosensitive transistors in the signal receiving box.

Referring now to the details of the invention as best shown in FIGS. 1, 2, and 3, reference numeral 10 indicates generally a submarine vessel embodying features of this invention. The vessel 10 consists of a pair of hollow plastic fiberglass hulls 12 spaced in conventional catamaran boat form. These hulls 12 have sufficient buoyancy when empty of water to support a hollow glass crew capsule or sphere 18 mounted thereon more than half out of the water when the vessel 10 is surfaced.

The sphere 18 is mounted on a pair of cross members 14 and 42 which extend between the hulls 12 intermediate the ends and another crossmember 16 joins the aft ends. The sphere 18 is divided into two equal halves, an upper hemisphere 20 and a lower hemisphere 22 but otherwise is devoid of any openings. Seats 24 are mounted inside on the lower hemisphere for accommodating the crew.

The sphere 18 is coated both inside and out with tough transparent layers 26 and 28 of phenolic resin of index of refraction nearly equal to that of the glass and the edges of the halves 20 and 22 are provided with flanged steel equatorial rings 30 and 32 as best shown in FIG. 8.

An O-ring 34 of rubber is provided to seal the flanged equatorial rings 30 and 32 at their juncture. A loose tapered double rubber flap 36 sealed around its outer perimeter except at opening 19 is attached to the rings 30, 32 and extends considerably around the same juncture to keep water out of the sphere when it is used as a rescue capsule and when the hemispheres 20 and 22 are opened on hinges 38. When closed, the hemispheres 20 and 22 are urged together and held to the vessel by three spaced magnetic hold-downs 40.

The hulls 12 are provided with head lamps 44 and a movable elevator vane 46. In the bottoms of the hulls 12, solenoid operating flooding valves 48 are located. To vent the interior for the flooding operation each hull has a stack 50 extending vertically above and terminating in a float valve assembly 52.

As best shown in FIG. 4 this float valve assembly 52 incorporates a float 54 which mates with an upper seat 56. Side guides 58 and a bottom support spider 60 spaced somewhat lower provide limited freedom of vertical motion for the float 54.

The vessel 10 is driven by a pair of motors 62 mounted in spaced relationship on the aft cross member 16. These motors 62 are of the three (3) phase squirrel cage AC type specially adapted for total immersion in water and to work over a wide range of power frequency. As shown in FIG. 7, each motor 62 is provided with a squirrel cage rotor 64 comprising the conventional copper bars or rods 66 in a slotted tubular ferrous core 68. A helical screw blade 69 is axially mounted inside the core 68 extending from one copper end ring 70 to the other. A pair of nose rings 72 on each side captivate the rotor 64 on a bearing seal arrangement 74 which also encloses the stator windings 76. Wiring leads 82, 84, 86 lead from within the motor casing 80 into a hollow strut 80 and thence into the aft cross member 16 for connection to power amplifiers as will now be related.

With reference to FIG. 6, each lead 82, 84 and 86 constitutes one phase connection to the motor 62. A separate power amplifier 90 feeds each lead 82, 84, and 86 totaling enough power to drive the vessel 10 adequately. The input to the amplifiers 90 consists of separate phototransistors 88 which provide a small current when illuminated by light reflected from a signal sending panel assembly 92. As shown in FIGS. 8 and 9, this panel assembly 92 is mounted inside the sphere 18 and thus is accessible to the crew. By rotating a knob or spinner 94 on the panel 92, a disc 98 is caused by a shaft 96 to rotate therebehind. Disc 98 has alternate light reflecting sectoral areas 100 and non-reflecting sectoral areas 102 on its surface facing the sphere 18.

A signal image forming and receiving box 104 is mounted on a bracket 106 exterior to the sphere 18 and close to the surface thereof. This box 104 is filled with liquid such as a transparent oil so as to withstand pressure. It also has a lens 108 mounted as in a camera to form an image of the rear of panel 92 on the interior rear surface as shown by the dash-dotted lines of FIG. 8. Illumination for this purpose is provided by lights 110.

The panel 92 may also carry slide "switches" 112, 113, 114. The rear of these slide "switches" are exposed through apertures 115 in the panel 92 and, depending on their setting, "on" or "off" display light reflecting areas 116 or non-reflecting areas 118.

The images of these "switches" 112, 113, 114 are formed by the lens 108 on corresponding photo transistors 112A, 113A, or 114A which provide input to power amplifiers 120, for controlling external apparatus 122 as shown in FIG. 5 and which, for example may be the solenoid of flooding valve 48.

It should be noted the photo transistors 112A, 113A and 114A as shown in FIG. 11 are mounted in linear array to receive the light signal from their respective linearly arranged slide switches 112, 113, 114. However, the photo transistors 88 are arranged in a circular array so the alternate light and dark sector images of disc 98 sweep around in continuous path thereover to generate a rotating phase current, photo transistor-to-photo-transistor.

The motor or motors 62 supplied with this amplified current will accordingly rotate in synchronism and direction with the rotation of the disk 98 but at twice the speed thereof. If continuous rotation is desired for long sustained travel a clock-work motor or equal may be used to drive the spinner 94.

With the transparent sphere 18 it will of course be possible to mount instruments in instrument boxes 124 exteriorly yet in full view of the occupants of seats 24 as shown in FIG. 2. Thus, this reduces to zero any necessity for openings which might leak water or reduce the safety of the crew capsule.

The vessel may be operated at neutral buoyance and driven up or down by means of vane 46. Also it may be raised through the agency of gas released inside the hulls 12 from bottles 126 containing compressed air, hydrogen generating lithium hydride, or decomposition products from the combination of contained liquid hydrazine and catalyst for example.

Should stray light on the photo transistors be a factor of unreliable control it is possible to energize the lights 110 with pulsating energy at some high rate and cause the associated signal receiving photo transistor circuitry to discriminate against all but such high frequency.

For retrieving objects, a scoop 128, as shown in FIGS. 1, 2, and 3, is secured on a shaft 130. This shaft 130 is arranged to be rotated in either direction by means of a gear 134 and worm 136 is driven by a motor 138. When the scoop 128 moves in the direction of the curved arrow, it will capture the object and deposit it into a perforated basket 132.

Other examples of the use of the vessel 10 of this invention will occur to those skilled in the art.

Obviously many modifications and variations of the present invention are possible in light of the above teachings. It is, therefore, to be understood that within the scope of the appended claims the invention may be practiced otherwise than as specifically described.

What is claimed is:

1. An undersea vessel, comprising, a floodable hull structure, an electromagnetic energy permeable capsule mounted to said hull structure, and electromagnetic energy means positioned within said capsule for signaling through the walls of said capsule and controlling external equipment without the need for apertures of any kind for this purpose in the walls of said capsule.

2. An undersea vessel as recited in claim 1, wherein said hull structure consists of floodable catamaran hulls.

3. An undersea vessel as recited in claim 2, and an electromagnetic energy controllable element mounted on at least one of said hulls, with said electromagnetic energy signaling means being positioned in said capsule and arranged to transmit signals through said walls of said electromagnetic energy permeable capsule to said electromagnetic energy controllable element for control thereof.

4. An undersea vessel as recited in claim 2, wherein said capsule is self-buoyant.

5. An undersea vessel as recited in claim 2, and means for detachably mounting said capsule between said hulls.

6. An undersea vessel as recited in claim 2, wherein said capsule is spherical and consists of two hemispheres.

7. An undersea vessel as recited in claim 6, and electromagnetic means for urging said hemispheres together and for holding said capsule to said hulls.

8. An undersea vessel as recited in claim 2, wherein said capsule is formed of a transparent material, a control panel positioned within said capsule, with said electromagnetic energy signaling means transmitting an image of said control panel through said transparent material to a point external of said capsule for further utilization.

9. An undersea vessel as recited in claim 4, wherein said capsule is formed of glass, and the walls of said capsule are coated with a material having an index of refraction nearly equal to glass.

10. An undersea vessel as recited in claim 2, and upstanding floodable stacks for flooding said catamaran hulls.

11. An undersea vessel as recited in claim 2, wherein said capsule is releasably mounted between said catamaran hulls.

12. An undersea vessel as recited in claim 11, wherein said capsule is formed of light transmitting glass, and said electromagnetic energy signaling means consists of light signaling apparatus positioned within said capsule for controlling said external equipment.

13. An undersea vessel as recited in claim 12, a control panel positioned in said capsule, controlled signal responsive means positioned outside of said capsule, said signal responsive means deriving signals from an optical image of said control panel transmitted by said light signaling apparatus.

14. An undersea vessel as recited in claim 12, a motor for propelling said catamaran hulls, and a motor control for controlling said motor consisting of a circular array of optical receivers, with a light image from said light signaling apparatus traversing said circular array of optical receivers.

15. An undersea vessel as recited in claim 1, an electromagnetic energy sensitive element to be controlled positioned on said hull externally of said capsule, with said electromagnetic energy signaling means positioned in said capsule and arranged for signaling through the walls of said capsule to said electromagnetic energy sensitive element to be controlled.

16. An undersea vessel as recited in claim 15, wherein said capsule is self-buoyant.

17. An undersea vessel as recited in claim 15, and means for detachably mounting said capsule to said hull structure.

18. An undersea vessel as recited in claim 15, wherein said capsule consists of two hemispheres.

19. An undersea vessel as recited in claim 18, and electro-magnetic means for urging said hemispheres together and for holding said capsule to said hulls.

20. An undersea vessel as recited in claim 15, wherein said electromagnetic energy sensitive element is light sensitive and said capsule is formed of a transparent material, a control panel positioned within said capsule with said electromagnetic energy signaling means transmitting an optical image of said control panel through said transparent material to said sensitive element for further utilization.

21. An undersea vessel as recited in claim 1, wherein said floodable hull is stabilized.

22. An undersea vessel as recited in claim 18, and additionally means for sealing the mating edges of said hemispheres.

23. A control system for operating equipment positioned exterior of an underwater vessel, comprising electromagnetic energy responsive power means positioned exterior of said vessel for powering said equipment, electromagnetic energy means positioned within said vessel, said vessel having an electromagnetic energy permeable section permitting electromagnetic energy communication between said electromagnetic energy means and said power means for control thereof, whereby no apertures in said vessel are necessary for this control purpose.

24. A control system for operating equipment positioned exterior of a vehicle for use underwater, comprising electromagnetic energy responsive power means positioned exterior of said vehicle for powering said equipment, electromagnetic energy means positioned within said vehicle, said vehicle having an electromagnetic energy permeable section permitting electromagnetic energy communication between said electromagnetic energy means and said power means for control thereof, whereby no apertures in said vehicle are necessary for this control purpose.

25. An undersea vessel, comprising, a hull structure, an electromagnetic energy permeable capsule mounted to said hull structure and electromagnetic energy means positioned within said capsule for signaling through the walls of said capsule and controlling external equipment without the need for apertures of any kind for this purpose in the walls of said capsule.

References Cited

UNITED STATES PATENTS

| | | | |
|---|---|---|---|
| 700,769 | 5/1902 | Hazard | 61—69 |
| 2,060,670 | 11/1936 | Hartman | 61—69 |
| 2,961,546 | 11/1960 | Spingies et al. | 250—217 X |
| 2,987,893 | 6/1961 | Robinson | 61—69 |
| 3,261,317 | 7/1966 | Gignoux | 114—16 |

OTHER REFERENCES

U.S. Naval Institute Proceedings, August 1964, pp. 53–64.

MILTON BUCHLER, *Primary Examiner.*

T. M. BLIX, *Assistant Examiner.*